United States Patent
McClain

(10) Patent No.: US 10,628,889 B2
(45) Date of Patent: Apr. 21, 2020

(54) GENERATING AN INVESTIGATIVE RESPONSE TO AN INCIDENT

(71) Applicant: Kevin W. McClain, Central City, IL (US)

(72) Inventor: Kevin W. McClain, Central City, IL (US)

(73) Assignee: MAC INNOVATIONS, LLC, Central City, IL (US)

( * ) Notice: Subject to any disclaimer, the term of this patent is extended or adjusted under 35 U.S.C. 154(b) by 460 days.

(21) Appl. No.: 14/839,015

(22) Filed: Aug. 28, 2015

(65) Prior Publication Data
US 2017/0061544 A1 Mar. 2, 2017

(51) Int. Cl.
*A01G 25/16* (2006.01)
*G06Q 40/08* (2012.01)

(52) U.S. Cl.
CPC .................................. *G06Q 40/08* (2013.01)

(58) Field of Classification Search
CPC ............................ G06Q 40/08; H04L 63/1408
USPC .......................................................... 705/4
See application file for complete search history.

(56) References Cited

U.S. PATENT DOCUMENTS

| 2013/0325943 A1* | 12/2013 | Al-Harthi | G06Q 50/01 709/204 |
| 2014/0188993 A1* | 7/2014 | Klein | G06Q 10/063 709/204 |
| 2015/0195676 A1* | 7/2015 | Endress | H04W 4/02 455/404.2 |

OTHER PUBLICATIONS

PCT Application No. PCT/US16/470741, International Search Report and Written Opinion dated Oct. 21, 2016, 12 pages.

\* cited by examiner

*Primary Examiner* — Hai Tran
(74) *Attorney, Agent, or Firm* — Lathrop GPM LLP

(57) ABSTRACT

Systems and methods include generating an investigative response to an incident so that investigators are alerted of the incident and information gathering of the incident is initiated with an investigator communications device. Embodiments of the present disclosure relate to generating an alert of an occurrence of an incident by an incident communications device positioned at a location of the incident. An investigator that receives the alert via an investigator communications device responds to the alert and arrives at the location of the incident to conduct an investigation. The investigator communications device records data of the incident and then generates an investigative report based on the recorded data. An investigative response center computing device monitors the investigation as well as searches social media sites for postings related to the incident. The computing device formalizes the report so that the report may be relied upon in a formal analysis of the incident.

28 Claims, 4 Drawing Sheets

GENERATING AN INVESTIGATIVE RESPONSE TO AN INCIDENT

BACKGROUND

After an incident occurs, such as an automobile accident, sufficient documentation of the incident is required so that so that a truthful as well as a robust gathering of facts as to how the incident occurred can be accumulated into a report. The report is then relied upon by insurance companies, risk managers, claims managers, law enforcement officials, attorneys, and/or judges when engaging the aftermath of the incident with regards to compensating the parties involved and/or with regards to any legal matters that result.

After an incident occurs, timely documentation of the incident is crucial. As each minute passes, the risk of witnesses of the incident disappearing as well as the scene of the incident changing and/or being tampered with increases exponentially. Without a sufficient report detailing the incident, significant questions will result in the aftermath of the incident causing doubt as to what was the cause of the incident and whether any responsibility should be allocated. Thus, a prompt response of an investigator to the scene of an incident as well as a thorough compilation of information related to the incident within a short time frame following the incident is crucial in the generation sufficient report of the incident.

BRIEF SUMMARY

Embodiments of the present disclosure relate to generating an investigative response to an incident by an investigator and the capturing of incident data related to the incident into a report that is generated within a threshold of time from the occurrence of the incident. In an embodiment, a method generates an investigative response to an incident so that investigative personnel are alerted of the incident and information gathering of the incident is initiated using an investigator communications device. The investigator communications device may receive an alert identifying an occurrence of the incident requiring the investigative response. The alert is generated from an incident communications device that is positioned at a location of the incident. The investigator communications device may receive social media data from an investigative response center. The social media data is associated with witness documentation of the incident that is recorded by at least one witness of the incident and then posted on at least one social media outlet. The investigator communications device may record an investigative report on the incident incorporating incident data associated with the incident that is obtained by an investigator at the location of the incident and the social media data received from the investigative response center. The investigator communications device may transmit the investigative report to the investigative response center. The investigative report outlines details associated with the incident to be relied upon in a formal analysis of the incident.

In an embodiment, an investigator communications device may be implemented to generate an investigative response so that investigative personnel are alerted of the incident and information gathering of the incident is initiated using the investigator communications device. The system includes a processor and memory coupled with the processor. The memory includes instructions that when executed by the processor cause the processor to receive an alert identifying an occurrence of the incident requiring the investigative response. The alert is generated from an incident communications device that is positioned at a location of the incident. The processor is configured to receive social media data from an investigative response center. The social media data is associated with witness documentation of the incident that is recorded by at least one witness of the incident and then posted on at least one social media outlet. The processor is configured to transmit an investigative report to the investigative response center. The investigative report outlines details associated with the incident to be relied upon in a formal analysis of the incident. The processor is configured to record the investigative report of the incident incorporating incident data associated with the incident that is obtained by an investigator at the location of the incident and the social media data received from the investigative response center.

In an embodiment, a method generates an investigative response to an incident so that information gathering of the incident is initiated at an investigative response center. The investigative response center may receive an alert identifying an occurrence of the incident requiring the investigative response. The alert is generated from an incident communications device that is positioned at a location of the incident. Social medial data associated with witness documentation of the incident that is recorded by at least one witness of the incident and then posted on at least one social media outlet may be searched. The investigative response center may transmit to an investigator communications device the social media associated with witness documentation of the incident to be provided in an investigative report outlining details associated with the incident to be relied upon in a formal analysis of the incident. The investigator communications device is in possession of an investigator assigned to evaluate the incident.

In an embodiment, an investigative response center computing device generates an investigative response to an incident so that information gathering of the incident is initiated at an investigative response center. The system includes a processor and memory coupled with the processor. The memory includes instructions that when executed by the processor cause the processor to search social media data associated with witness documentation of the incident that is recorded by at least one witness of the incident and then posted on at least one social media outlet. The processor is configured to receive an alert identifying an occurrence of the incident requiring the investigative response. The alert is generated from an incident communications device that is positioned at a location of the incident. The processor is configured to transmit to an investigator communications device the social media associated with witness documentation of the incident to be relied upon in a formal analysis of the incident. The investigator communications device is in possession of an investigator assigned to evaluate the incident.

Further embodiments, features, and advantages, as well as the structure and operation of the various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements.

DETAILED DESCRIPTION

Embodiments of the disclosure generally relate to generating a report of an incident. In an example embodiment, an investigative response to an incident is generated. After an incident has occurred, an incident communications device positioned at the location of the incident may generate an alert that identifies the occurrence of the incident. For example, a driver of a car involved in an automobile accident may trigger the alert via the incident communications device. The alert may be received by investigators located within a radius of the incident so that investigators that can reach the location of the incident within a threshold of time after the occurrence of the incident are notified.

An investigative response center may also be notified of the incident and may capture social media data being posted onto social media outlets by witnesses of the incident. The investigator that accepts the investigation of the incident may then upon arrival record incident data present at the location of the incident as well as the social medial data into an investigative report. The investigative report may then be uploaded for distribution to interested parties, such as insurance carriers, attorneys, risk managers, claims managers and law enforcement agencies. The generation and the distribution of the investigative report may be completed within a reasonable of time of the incident such that investigative report includes accurate and robust facts relating to the incident and may be relied upon in any formal analysis of the incident.

In the Detailed Description herein, references to "one embodiment", "an embodiment", an "example embodiment", etc., indicate that the embodiment described may include a particular feature, structure, or characteristic, by every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in the art to affect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

System Overview

Figure 1:
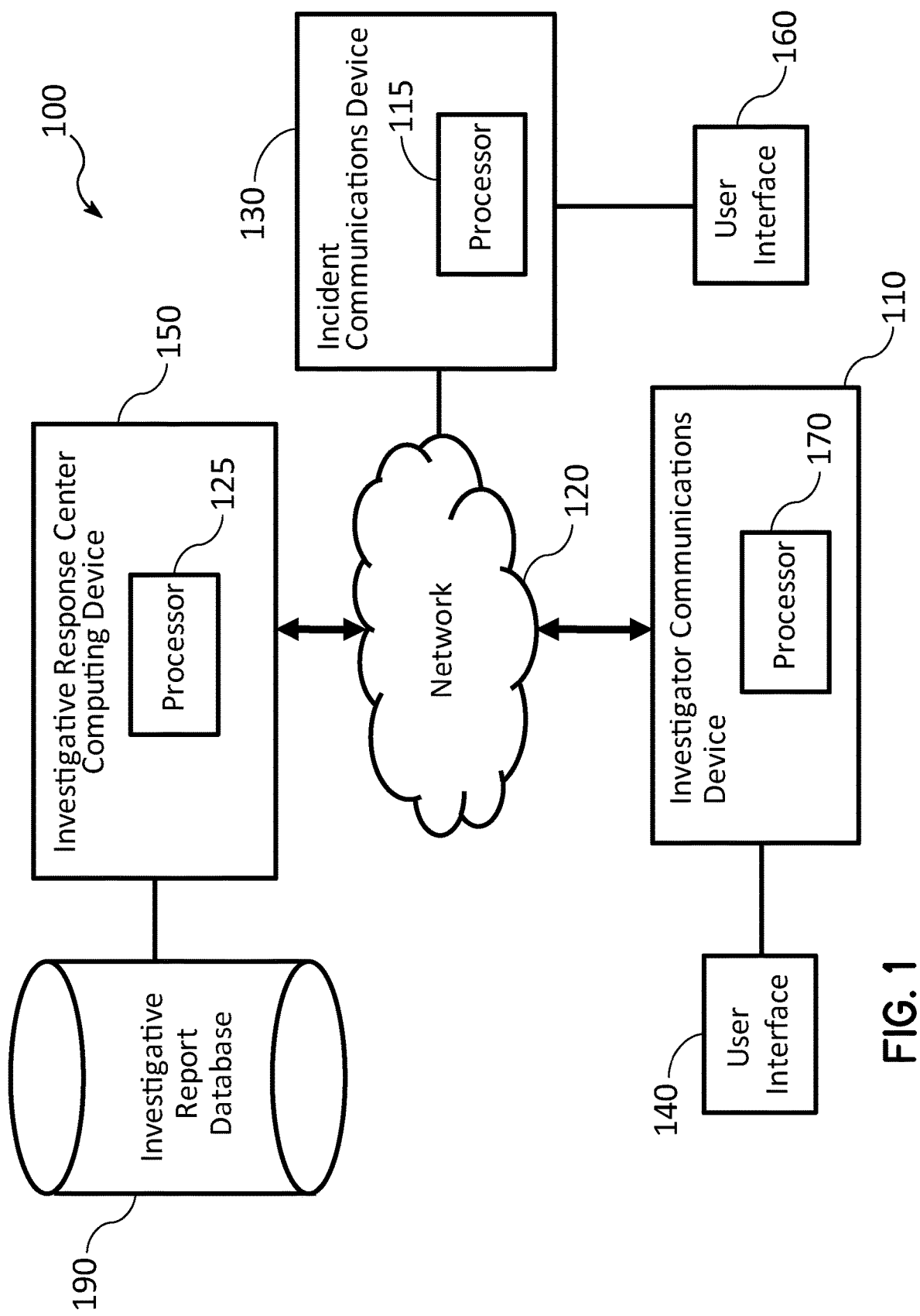
FIG. 1 shows an illustration of an investigative response system.

As shown in FIG. 1, investigative response system 100 includes an investigator communications device 110, a network 120, an incident communications device 130, a user interface 140, an investigative response center computing device 150, a user interface 160, and an investigative report database 190. Incident communications device 130 includes a processor 170. Investigator communications device 110 includes a processor 170, and investigative response center computing device 150 includes a processor 125.

Investigator communications device 110 may be a device that is capable of electronically communicating with other devices. Examples of investigator communications device 110 may include a mobile telephone, a smartphone, a workstation, a portable computing device, other computing devices such as a laptop, or a desktop computer, cluster of computers, set-top box, a computer peripheral such as a printer, a portable audio, and/or video player, a payment system, a ticketing writing system such as a parking ticketing system, a bus ticketing system, a train ticketing system or an entrance ticketing system to provide some examples, or in a ticket reading system, a toy, a game, a poster, packaging, an advertising material, a product inventory checking system and or any other suitable electronic device that will be apparent to those skilled in the relevant art(s) without departing from the spirit and scope of the invention.

In an embodiment, multiple modules may be implemented on the same communications device. Such a communications device may include software, firmware, hardware, or a combination thereof. Software may include one or more applications on an operating system. Hardware can include, but is not limited to, a processor, memory, and/or graphical user interface display.

Investigator communications device 110 may be operated by an investigator that is at a location that an incident has occurred with the intent to investigate the incident and generate an investigative report that outlines details of the incident. An incident is an event that has been caused directly and/or indirectly from decisions made by individuals in which some type of negative consequence has resulted from the incident. For example, an incident results when a driver of a passenger car slams on the brakes due to slowing traffic and subsequently a driver of a semi-trailer truck slams into the rear-end of the passenger car causing damage to the passenger car.

Other examples of incidents include but are not limited to incidents associated with truck accidents, truck security, truck metrics/safety, fleet accidents, fleet security, fleet metrics/safety, transit accidents, transit security, transit metrics/safety, ride sharing accidents, ride sharing security, ride sharing metrics/safety, rental vehicle accidents, rental vehicle security, rental vehicle metrics/safety, railroad accidents, railroad metrics/safety, security premise incidents, workplace violence incidents, active shooter incidents, campus security incidents, insurance claims, workers compensation claims, investigator/client, attorney/client, business employees, auto accidents, auto security, auto metrics/safety, civil investigations, cause and origin investigations, accident reconstructionist, homeland security, conceal carry investigations, executive protection, labor strikes, natural disasters, residential claims, process service, criminal investigations, risk management, identity theft, neighborhood watch, municipalities, non-profits, public health, surveillance, business to consumer, business to business and/or any other type of incidents caused by the decisions made by individuals resulting in a negative consequence that will be apparent from those skilled in the relevant art(s) without departing from the spirit and scope of the present disclosure.

In an embodiment, investigator communications device 110 may be customized to the investigation of the type of incident for which investigator communications device 110 is being implemented. For example, investigator communications device 110 may be offered as a white label version in which the investigator of investigator communications device 110 may brand investigator communications device 110 for implementation specific to the investigation of the types of incidents executed by the investigator.

The investigator may implement investigator communications device 110 when conducting an investigation of the incident. An investigation of the incident is a systematic approach in gathering facts associated with the incident so that a conclusion as to the cause of the incident as well as any fault associated with the parties involved in the incident may be determined from the investigation. For example, an investigation of vandalism committed in a hotel room includes gathering facts as to the individual that the hotel room was checked out to, the hotel personnel that had access to the hotel, signs as to whether an individual forcefully entered into the hotel room and so on so that a conclusion as to the cause of the incident as well as finding fault with the appropriate parties may be determined.

The investigator is an individual that is equipped with a skill set to gather the necessary facts associated with the incident and to summarize those facts into an investigative report. The investigator gathers the facts to form a cohesive and logical depiction of the incident. The investigator is an impartial and objective finder of fact that seeks to determine the truth what occurred with regards to the incident. For example, the investigator may be a certified investigator that is certified to conduct investigations of worker compensation claims to determine whether the employee actually has been injured and whether the injury was caused by negligence of the employer, the negligence of the employee, and so on. In an embodiment, the investigator may be a certified. In another embodiment, the investigator may market themselves as an investigator capable of conducting investigations of incidents and to generate investigative reports that may be relied upon in a formal analysis of the incident.

The investigative report is a summary of data associated with the incident that is gathered and/or recorded by the investigator so that the investigative report may provide insight to the incident so that the investigative report may be relied upon in a formal analysis of the incident. For example, the investigative report may provide a summary of data that when analyzed collectively may provide insight as to the cause of the incident, the parties that are at fault of the incident, damage caused in the incident, each parties contribution to causing the damage, and so on.

The investigative report may then be relied upon in a formal analysis of the incident. A formal analysis of the incident is an assessment by a party of interest to determine the responsibility of the parties involved in the incident as well as any monetary allocation that one party is responsible to another party following the incident. A party of interest associated with the incident communications device 130 may be an entity that may have a stake in the incident in which the party of interest may be impacted by the occurrence of the incident, such as an insurance company. A party of interest may also be a party that has significant interest in the incident whether the interest be financial, contractual in which the party of interest rectifies the incident such as by providing monetary compensation, legal in which the party has a legal obligation to legally rectify the incident, risk management, claims management, attorneys and so on. Examples of party of interests include but are not limited to insurance companies, law enforcement agencies, companies that employ individuals involved in the incident, courts, and/or any other party that has an interest in the incident that will be apparent from those skilled in the relevant art(s) without departing from the spirit and scope of the present disclosure.

For example, the investigative report may be analyzed by an insurance company to determine whether the insurance company is responsible to pay money to any of the parties involved in the incident. In another example, the investigative report may be analyzed by a court of law to determine the contribution of a party to causing the damage to another party and the money required to be paid by the contributed party to the damaged party.

An investigator engaged in recording data associated with the incident and generated the investigative report may interact with investigator communications device 110 via user interface 140. User interface 140 may include any type of display device including but not limited to a touch screen display, a cathode ray tube (CRT) monitor, a liquid crystal display (LCD) screen, and/or any other type of display device that includes a display that will be apparent from those skilled in the relevant art(s) without departing from the spirit and scope of the present disclosure.

One or more incident communications devices 130 may engage one or more investigator communications devices 110. Examples of investigator communications device 110 may include a mobile telephone, a smartphone, a workstation, a portable computing device, other computing devices such as a laptop, or a desktop computer, cluster of computers, set-top box, a computer peripheral such as a printer, a portable audio, and/or video player, a payment system, a ticketing writing system such as a parking ticketing system, a bus ticketing system, a train ticketing system or an entrance ticketing system to provide some examples, or in a ticket reading system, a toy, a game, a poster, packaging, an advertising material, a product inventory checking system and or any other suitable electronic device that will be apparent to those skilled in the relevant art(s) without departing from the spirit and scope of the invention.

In an embodiment, multiple modules may be implemented on the same communications device. Such a communications device may include software, firmware, hardware, or a combination thereof. Software may include one or more applications on an operating system. Hardware can include, but is not limited to, a processor, memory, and/or graphical user interface display.

Incident communications device 130 may be positioned at a location of which an incident has occurred and then may generate an alert that identifies the occurrence of the incident that requests an investigative response. Incident communications device 130 may transmit the alert to one or more investigator communications devices 110 to alert the investigator(s) associated with the investigator communications device(s) 110 that an incident that requires an investigative response has occurred. The investigative response includes the actions taken by an investigator to conduct the investigation of the incident and to generate an investigative report detailing the incident.

In an embodiment, the alert may be triggered by an individual in possession of incident communications device 130. For example, a bus driver that is in possession of the incident communications device 130 may trigger the alert when an automobile runs a red light causing the bus to crash into the automobile. In another embodiment, the alert may be automatically triggered based on an event that is identified by incident communications device 130. For example, incident communications device 130 triggers the alert when accelerometers sense that contact with the vehicle has occurred when the velocities of the vehicle exceed a threshold.

An individual in possession of the incident communications device 130 may interact with incident communications device 130 via user interface 150. User interface 150 may include any type of display device including but not limited to a touch screen display, a cathode ray tube (CRT) monitor, a liquid crystal display (LCD) screen, and/or any other type of display device that includes a display that will be apparent from those skilled in the relevant art(s) without departing from the spirit and scope of the present disclosure.

As shown, investigator communications device 110 and incident communications device 130 stream the data to investigative response center computing device 150 via network 120. Network 120 includes one or more networks, such as the Internet. In some embodiments of the present invention, network 120 may include one or more wide area networks (WAN) or local area networks (LAN). Network 120 may utilize one or more network technologies such as Ethernet, Fast Ethernet, Gigabit Ethernet, virtual private network (VPN), remote VPN access, a variant of IEEE 802.11 standard such as Wi-Fi, and the like. Communication over network 120 takes place using one or more network communication protocols including reliable streaming protocols such as transmission control protocol (TCP). These examples are illustrative and not intended to limit the present invention.

One or more investigative response center computing devices 150 may connect to one or more investigator communications devices 110 and/or one or more incident communications devices 130 via network 120. Investigative response center computing device 150 may include a data acquisition system, a data management system, intranet, conventional web-server, e-mail server, a mobile telephone, a smartphone, a workstation, a portable computing device, other computing devices such as a laptop, or a desktop computer, cluster of computers, set-top box, or file transfer server modified according to one embodiment. Investigative response center computing device 150 is typically a device that includes a processor, a memory, and a network interface, hereinafter referred to as a computing device or simply "computer."

Investigative response center computing device 150 may be a central hub that monitors the interactions between the incident communications device 130 and investigator communications device 110. Based on the monitoring of such interactions, investigative response center computing device 150 may monitor the progress of the investigation conducted by the investigator. In doing so, investigative communications device 110 may supplement the investigation as needed. The investigative response center computing device 150 may also receive the investigative report from the investigator, finalize the investigative report and then provide the investigative report to interested parties.

Investigator communications device 110, incident communications device 130, investigative response center computing device 150, and investigative report database 190 may share resources via network 120. For example, investigative response center computing device 150 may retrieve investigative reports from the investigative report database 190 and provide those investigative reports to interested parties so that the interested parties may conduct a formal analysis of the incident. Investigator communications device 110 may also provide the investigative report. Incident communications device 130 may generate alerts that an incident requiring an investigative response has occurred. Based on the cloud computing configuration, the interaction between investigator communications device 110, incident communications device 130, and investigative response center computing device 150, and investigative response database 190 may not be limited to a single computing device. For example, a plurality of computing devices may update investigative report database 190 via network 120 with data associated with the incident.

Investigative response system 100 may generate a prompt investigative response to an incident so that a sufficient and robust investigative report may be generated. The period of time immediately following an occurrence of the incident is crucial when generating a sufficient investigative report that may adequately summarize the incident so that the investigative report may be accurately relied upon in a formal analysis of the incident. The time immediately following the incident tends to provide a scene of the incident that is intact as well as having witnesses that observed the incident still positioned at the location of the incident.

The scene of the incident is the aftermath of the incident before any clean-up of the incident has been initiated. The time immediately following the incident, such as immediately following a car accident, has the cars involved in the incident still in place and have yet to be moved. An investigator attempting to conduct investigation of the incident may gather valuable data as to how the incident occurred by analyzing the scene of the incident before any clean-up of the incident has been initiated. Further, witnesses that observed the incident, such witnesses that observed the car accident, may still be positioned at the scene of the accident and can be easily identified and interviewed by the investigator.

The more time that lapses following an incident without an investigative response of an investigator to gather data associated with the incident increases the risk that any investigative report of the incident may not include sufficient data so that any formal analysis that relies on the investigative report may have significant questions with regards to the incident. Thus, the generation of the alert by incident communications device 130 positioned at the location of the incident may alert an investigator associated with investigator communications device 110 immediately following the occurrence of the incident. The investigator may then promptly arrive at the location of the incident to conduct an investigation while the scene of the incident is still intact and may interview witnesses before the witnesses depart from the scene. Investigative response center computing device 150 may monitor the investigation and supplement the investigation with additional data, such as data posted on social media that documents the incident.

The investigator may then promptly generate an investigative report that includes accurate and robust data such that any formal analysis of the incident report may result in an accurate determination as to the cause of the incident, parties at fault, and so on. Investigative response center computing device 150 may finalize the investigative report once completed by the investigator to ensure that the investigative report includes any type of available data and submit the investigative report to interested parties in a timely manner. The promptness in executing an investigation of the incident and the completion of the investigative report by investigative response system 100 may lower the uncertainty with regards to the incident so that appropriate actions may then be executed with little uncertainty by parties of interest such as insurance companies, law enforcement agencies, risk managers, claims managers, attorneys, and so on.

Investigative Response Generation

As noted above, investigative response system 100 may generate an investigative response to an incident so that investigators are alerted of the incident and information gathering of the incident may be initiated. Initially, incident communications device 130 positioned at the location of the incident generates an alert that an incident requiring an investigative response by an investigator has occurred. Investigators within a radius of the location of the incident receive the alert. The investigator that accepts the request to conduct the investigation of the incident confirms that acceptance and travels to the location of the incident.

Figure 2:
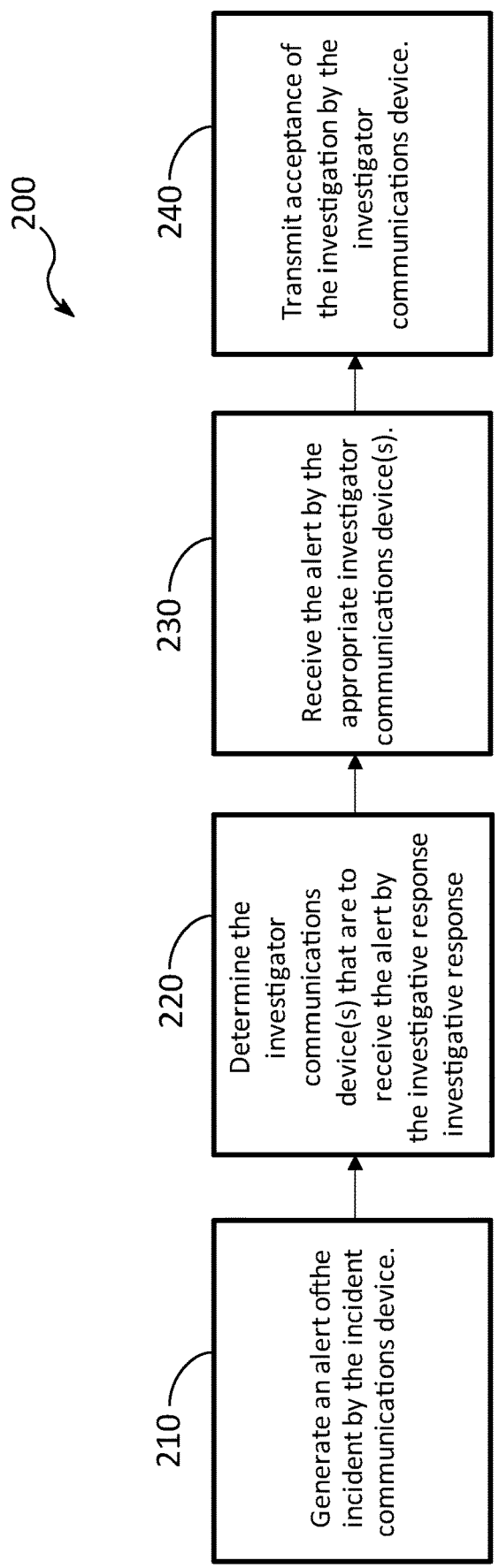
FIG. 2 is a flowchart showing an example method of generating an investigative response to an incident.

One such implementation of generating an investigative response to an incident is illustrated by process 200 in FIG. 2. Process 200 includes five primary steps: generate an alert of the incident by the incident communications device 210, determine the investigator communications device(s) that are to receive the alert 220, receive the alert by the appropriate investigator communications device(s) 230, and transmit acceptance of the investigation by the investigation communications device 240. Steps 210-240 are typically implemented in a computer, e.g., via software and/or hardware, e.g., incident communications device 130, investigative response center 150, and/or investigator communications device of FIG. 1.

In step 210, an alert may be generated by the incident communications device 210 that may be positioned at the location of the incident. The alert may identify the occurrence of the incident and indicate that an investigative response from an investigator is required. In an embodiment, the alert may be manually triggered by an individual in possession of incident communications device 130, such as a driver of a vehicle involved in an accident. In such an embodiment, the individual may engage user interface 160 of incident communications device 130 and trigger the alert such that incident communications device 130 transmits the alert.

In an embodiment, the alert may be automatically triggered by incident communications device 130. In such an embodiment, a condition associated with incident communications device 130 may be satisfied that automatically triggers the alert generated by incident communications device 130. For example, accelerometers may be positioned on a vehicle in which the accelerometers monitor the acceleration, deceleration, and velocity of the vehicle. The alert may be triggered when the acceleration increases beyond a threshold and/or decelerates below a threshold indicating that the vehicle may have engaged in an accident. In such a case, the alert may be triggered when the operator of the vehicle is unconscious and/or unable to manually trigger the alert.

The alert may be transmitted by incident communications device 130 to investigative response center computing device 150, investigator communications device 110, a party of interest and/or any other entity that may be interested in the occurrence of the incident that will be apparent to those skilled in the relevant art(s) without departing from the spirit and scope of the present disclosure. The alert may be transmitted via email, SMS, messages within the software loaded on incident communications device 130 and/or any other communication means that will be apparent to those skilled in the relevant art(s) without departing from the spirit and scope of the present disclosure. The alert may also be transmitted as a mass alert to all investigator communications devices so that all investigators in possession of investigator communications devices may receive the mass alert. For example, an AMBER alert may be generated as a mass alert to all investigator communications devices so that all of the investigators in possession of investigator communications devices receive the AMBER alert and may contribute to the search of the missing child.

In an embodiment, the individual may contact user interface 160 and press a button displayed by user interface 160 to generate the alert when data service such as 3G and/or 4G is available to incident communications device 130. Incident communications device 130 may transmit the alert via SMS and/or enable the individual to generate the alert via a direct dial when data service such as 3G and/or 4G is unavailable. In an example embodiment, step 210 may be performed by processor 115 of incident communications device 130 as shown in FIG. 1.

After the alert is generated, in step 220, investigator communications devices 110 that are to receive alert may be determined by investigative response center computing device 150. In an embodiment, investigative response center computing device 150 may initially receive the alert generated by incident communications device 130. Investigative response center computing device 150 may associate a user identification number to the alert. For example, incident communications device 130 may be subscribed to an incident response service supported by investigative response center computing device 150 and have a user identification number associated with incident communications device 150. Investigative response center computing device 150 may access information associated with incident communications device 130 such as the information of the individual in possession of the incident communications device 130, the insurance company associated with incident communications device 130 and so on.

Investigative response center computing device 150 may also receive global positioning system (GPS) coordinates from the alert that identify the location of incident communications device 130. Investigative response center computing device 150 may then establish a geo-fence around the GPS coordinates of the location of incident communications device 130. The geo-fence may identify a maximum radius from the location of incident communications device 130 in which investigators positioned within the geo-fence may arrive at the location of the incident within a threshold of time from the occurrence of the incident. The threshold of time may be an amount of time from the occurrence of the incident in which pertinent data associated with the incident may be obtained such that an adequate incident report may be generated. As noted above, the risk that pertinent data associated with the incident being altered and/or eliminated as well as witnesses of the incident departing the location of the incident increases significantly as the time of the incident continues to lapse. As a result, the geo-fence may identify the investigators that may arrive at the incident in a sufficient amount of time before the incident is altered by cleaning crews, witnesses of the incident have departed the location and may no longer be identified and so on.

Investigative response center computing device 150 may then identify the investigators that are physically positioned within the geo-fence and have the potential of arriving at the location of the incident within the threshold of time from the incident. Investigative response center computing device 150 may identify the investigators physically positioned within the geo-fence based on the GPS coordinates of each investigator communications device 110 in possession of each investigator. Investigative response center computing device 150 identifies the eligible investigators to address the incident when the GPS coordinates of the investigator communications device 110 are within the geo-fence.

In an embodiment, each investigator communications device 110 may have a status of "Notification Pending", "On Call", or "Unassigned." Each investigator communications device 110 may also have a date and time of the last notification of an incident received by investigator communications device 110 requesting the investigator to investigate a previous incident. The status of "Notification Pending" may identify that investigator communications device 110 has already received a notification to accept a previous incident and has not accepted the notification and/or have had the time period to accept the incident lapse. The status of "On Call" may identify that the investigator has accepted the last notification of an incident but has yet to submit an investigative report. The status of "Unassigned" may identify that the investigator is available to investigate the incident.

Investigative response center computing device 150 may then assess investigator communications devices 110 that are within the geo-fence as well as having an "Unassigned" status. Investigative response center computing device 150 may evaluate the date and time of the last notification associated with each investigator communications device 110. Investigative response center computing device 150 may identify which investigator communications device 110 that has the oldest date and time of the last notification and then transmit the alert of the occurrence of the incident to that investigator communications device 110. The alert may include a brief description of the incident and the GPS coordinates of the location of the incident.

The alert may also include a time period of expiration for the investigator to accept the request to investigate the incident. The time period of expiration may be an amount of time that provides the opportunity to assess whether that they can adequately conduct the investigation of the incident in a reasonable amount of time. However, the time period of expiration may be an amount of time that lapses promptly so that the next investigator may be contacted without allowing significant time lapse from the occurrence of the incident. After the time period of expiration lapses, investigative response center computing device 150 may then transmit the alert to the investigator communications device 110 with the next oldest date and time of the last notification and so on. Investigative response center computing device 150 may also record a user identification number associated with the investigator and record that the investigator failed to respond.

In additional embodiments, investigative response center computing device 150 may determine which investigator communications device 110 to alert as to the incident based on but not limited to a random selection of investigator communications devices located within the geo-fence, investigator communications devices that pay higher subscription prices to receive the alerts, investigator communications devices associated with investigators that have the highest rate of acceptance of alerts, investigator communications devices associated with investigators that have performed the greatest number of investigations, investigator communications devices with GPS coordinates that are closest to the location of the incident, investigator communications devices associated with investigators that have an expertise in investigating the type of incident that has occurred, the investigator to first respond to the alert after the alert is transmitted to several investigator communication devices within the geo-fence and/or any other type of selection such that an investigator communications device 110 within the geo-fence receives the alert that will be apparent to those skilled in the relevant art(s) without departing from the spirit and scope of the present disclosure. In an example embodiment, step 220 may be performed by processor 170 of investigative response center computing device 150 as shown in FIG. 1.

In step 230, the alert may be received by the appropriate investigator communications device. After investigative response center computing device 150 has determined which investigator communications device(s) to transmit the alert, such investigator communications device(s) may receive the alert. In an embodiment, a single investigator communications device 110 as selected by investigative response center computing device 150 receives the alert. In another embodiment, several investigator communications devices 110 that have GPS coordinates within the geo-fence receive the alert and the first investigator communications device 110 that accepts the investigation is tagged as the investigator to conduct the investigation. In an example embodiment, step 230 may be performed by processor 115 of incident communications device 130 as shown in FIG. 1.

In step 240, acceptance of the investigation may be transmitted by investigator communications device 240. After investigator communications device 110 has received the alert, the investigator associated with investigator communications device 110 may determine whether to accept the investigation of the incident. Investigator communications device 110 may then transmit acceptance of the investigation to investigative response center computing device 150, incident communications device 130 and/or the party of interest associated with incident communications device 130.

Investigator communications device 110 may transmit to investigative response center computing device 150, incident communications device 130 and/or the party of interest the name of the investigator, the agency of the investigator, the phone number of the investigator and/or any other pertinent contact information so that the investigator may be identified. Investigator communications device 110 may also transmit an image of the investigator such that the individual associated with incident communications device 130 may easily identify the investigator that has accepted the investigation on behalf of the individual and/or the party of interest of the individual. The ease of identification of the investigator may enable the individual to easily confirm the investigator that the individual may freely disseminate data to with the understanding that the investigator is conducting the investigation on behalf of the individual and/or party of interest. Other investigators at the location of the incident may be associated with other parties and have the intent to coerce the individual to communicate data in a manner favorable to the other parties.

Incident communications device 130 may transmit to investigative response center computing device 150, investigator communications device 110, and/or the party of interest of the investigator, the name of the individual in possession of incident communications device 130, the phone number of the individual and/or any other pertinent contact information so that the information may be identified. Incident communications device 130 may also transmit an image of the individual such that the investigator may easily identify the individual that is associated with incident communications device 130 that triggered the alert. Incident communications device 130 may also transmit data associated with the incident such as the make/model of the vehicle associated with the individual, color of the vehicle, and so on so that the investigator may also easily identify the vehicle of the individual. The ease of identification may enable the investigator to easily confirm the individual that the investigator is conducting the investigation on behalf of. In an example embodiment, step 240 may be performed by processor 170 of investigator communications device 110 as shown in FIG. 1.

Investigative Report Generation

As noted above, investigative response system 100 may generate an investigative report that details an incident so that the investigative report may be relied upon in a formal analysis of the incident. Initially, investigator communications device 110 transmits the arrival of the investigator at the location of the incident. Investigator communications device 110 may then record incident data associated with the incident as captured from the location of the incident. Investigative response center computing device 150 may search for social media data associated with the incident and provide that social media data to investigator communications device 110. Investigator communications device 110 may then generate an investigative report based on the incident data and the social media data associated with the incident. Investigative response center computing device 150 may then finalize the investigative report so that the investigative report may be relied upon in a formal analysis of the incident.

Figure 3:
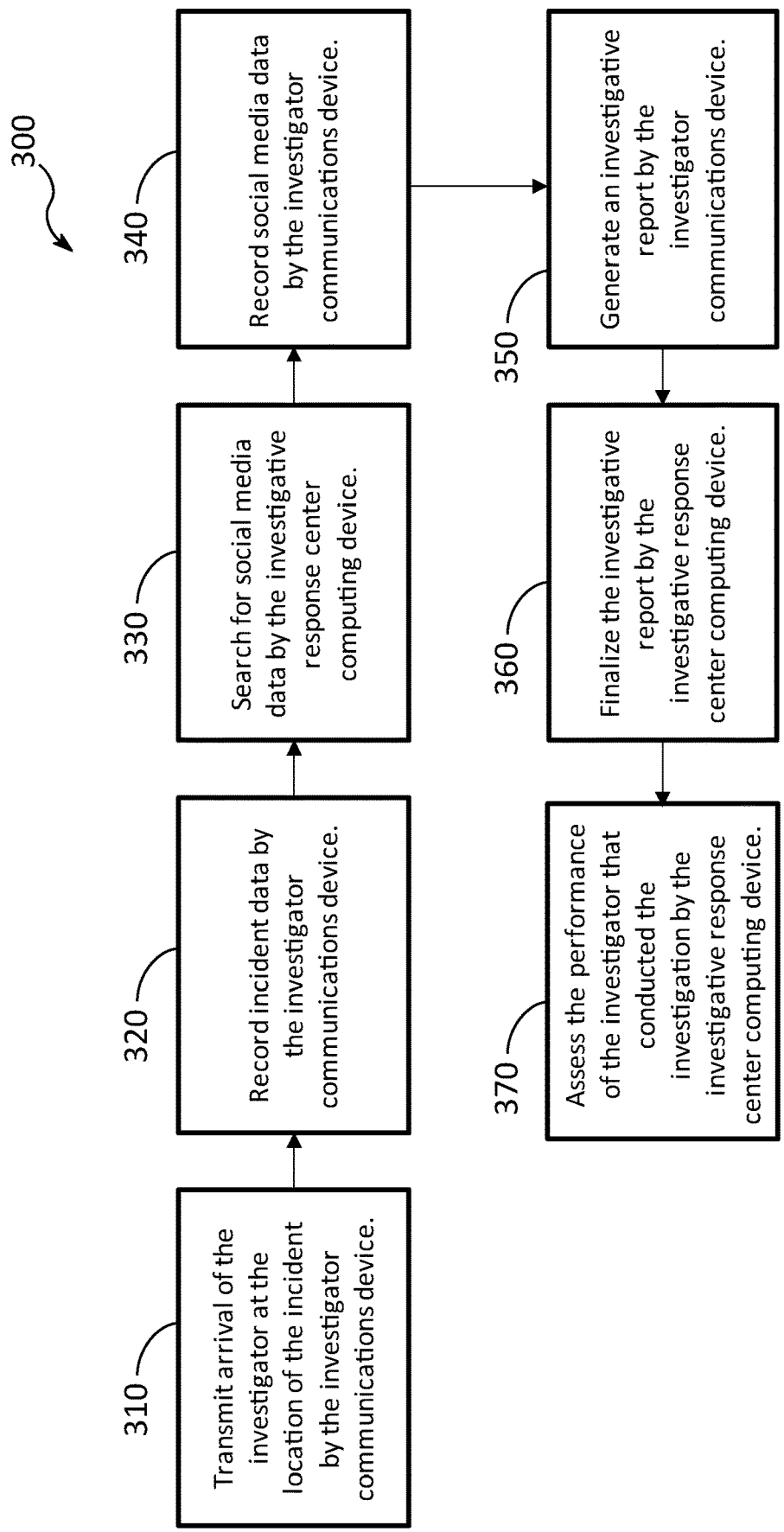
FIG. 3 depicts a flowchart showing an example method of generating an investigative report of an incident.

One such implementation of generating an investigative report of an incident is illustrated by process 300 in FIG. 3. Process 300 includes seven primary steps: transmit arrival of the investigator at the location of the incident by investigator communications device 310, record incident data by the investigator communications device 320, search for social media data by the investigative response center computing device 330, record social media data by the investigator communications device 340, generate an investigative report by the investigator communications device 350, finalize the investigative report by investigative response center computing device 360, and assess the performance of the investigator that conducted the investigation by investigative response center computing device 370. Steps 310-370 are typically implemented in a computer, e.g., via software and/or hardware, e.g., incident communications device 130, investigative response center 150, and/or investigator communications device of FIG. 1.

In step 310, investigator communications device 310 may transmit the arrival of the investigator at the location of the incident to incident communications device 130, investigative response center 150, and/or any parties of interest. The individual in possession of incident communications device 130 positioned at the location of the incident, the investigative response center, and any parties of interest may be notified that an investigator has reached the location of the incident and that the investigation of the incident is underway. In an example embodiment, step 310 may be performed by processor 170 of investigator communications device 110 as shown in FIG. 1.

In step 320, the investigator may record incident data obtained from the location of the incident with investigator communications device 320. Incident data is data associated with the incident that provides insight into the incident. Incident data when accumulated may provide better understanding as the events that occurred before the incident, during the incident, and/or after the incident. For example, incident data may provide insight as to the cause of the incident, the parties involved in the incident, damage resulting from the incident, parties at fault for the incident, the level of fault each party for the damage caused to the other party, and/or any other aspect of the incident that provides a better understanding of the incident that will be apparent to those skilled in the relevant art(s) without departing from the spirit and scope of the invention.

Investigator communications device 110 may have the capability to record incident data at the location of the incident in real-time such that incident data may be uploaded and saved by investigator communications device 110 at the location of the incident. For example, investigator communications device 110 may record audio, attach audio recordings, and provide context associated with the audio recordings and upload and save the audio recordings and context at the location of the incident. The investigator does not have to record the audio recordings with a tape recorder and then at a later time transcribe the audio recordings and/or convert the audio recordings to a medium that may be saved.

Other examples of incident data recorded by investigator communications device 110 at the location of the incident may include but is not limited to recording video, attaching video recordings, providing context associated with the video recordings, capturing photographic images, attaching photographic images, and providing context associated with the photographic images such that the video recordings and the photographic images are uploaded and saved by investigator communications device 110 at the location of the incident. Investigator communications device 110 may also record notes that the investigator takes with regards to the investigation of the incident and save those notes at the location of the incident as well as any other incident data that may be uploaded and saved by investigator communications device 110 that will be apparent to those skilled in the relevant art(s) without departing from the spirit and scope of the invention.

The recording of incident data as well as the uploading and saving of the incident data by investigator communications device 110 at the location of the incident may result in a thorough capturing of incident data in a timely manner. As noted above, as the amount of time increases following the occurrence of the incident, the likelihood that incident data may be lost due to the altering of the scene of the incident and/or the departing of witnesses from the scene of the incident increases. The ease in capturing incident data by investigator communications device 110 and then the uploading and the saving of the incident data vastly speeds up the investigation conducted by the investigator as well as preserves the incident data in a single location at the location of the incident rather than having to accumulate the incident data together at a later time.

For example, the investigator does not have to pull out a camera and capture photographic images of the location of the incident and then pull out an audio recorder when the investigator notices a potential witness and then pull out a video camera when an opportunity to video the location of the incident arises. Rather, the investigator may capture photographic images with investigator communications device 110, then record an interview with a witness with investigator communications device 110, and then video the location of the incident with investigator communications device 110. Conducting an investigation at the location of the incident may be a fluid experience in which opportunities to record incident data may instantaneously arise and any hesitation to take advantage of the instant may result in a failure of capturing the incident data. Recording such a diverse amount of incident data with a single investigator communications device 110 provides the investigator the flexibility to quickly react to opportunities to capture incident data as those opportunities arise.

Further, the uploading and storing of the incident data by investigator communications device 110 enables the investigator to easily save the incident data in a timely manner. For example, the investigator does not have to ensure that the photographic image was safely taken and saved and then ensure that the audio recording was correctly saved and then ensure the video recording was correctly saved. The investigator also then does not have to at a later date piece the photographic images together with the audio recordings and the video recordings so that all are saved in the same location. Rather, the investigator may easily and quickly capture and save each incident data with investigator communications device 110 so that the incident data is saved in the same location at the location of the incident rather than piecing together at a later time. In an example embodiment, step 320 may be performed by processor 170 of investigator communications device 110 as shown in FIG. 1.

In step 330, investigative response center computing device 150 may search for social media data associated with the incident. Social media outlets have become a dominant aspect of communication in society. Individuals document events in real-time via communications devices and then upload that documentation to social media outlets to share the documentation of events with participants all over the world that also engage the social media outlets. Social media outlets include means of disseminating information so that large quantities of people may also engage the information via the social media outlets. Social media outlets may include websites and other online means of communications that are used by large groups of people to share information. Social media outlets may also include internet reporting of incidents. For example, social media outlets may include Facebook, Twitter, YouTube, Pintrest, Instagram Panarimo, MySpace, news websites, search engine websites such as msn.com, google.com, bing.com and yahoo.com, and/or any other type of social media outlet in which individuals may upload information for large amounts of people to view that will be apparent to those skilled in the relevant art(s) without departing from the spirit and scope of the invention.

Thus, witnesses of an incident may in real-time capture social media data of the incident and then upload the social media data to social media outlets. Social media data is data captured by witnesses of an incident that provides insight into the incident that is then uploaded onto social media outlets to be viewed. Social media data may be captured in real-time by witnesses of the incident such that the social media data provides a significant understanding of the events that occurred before the incident, during the incident, and/or after the incident. Social media data may also be data that is reported via the internet such as news articles that are posted on news websites and/or any other type of internet postings that when researched may provide insight to the incident. Individuals directly involved in the incident may have a skewed view as to the events of the incident. However, witnesses of the incident may provide an impartial view as to the events of the incident as being observers of the incident and then confirm that impartial view by capturing the incident with communications devices in real-time while at the location of the incident. As a result, social media data may have a significant impact in generating a robust and accurate investigative report of the incident.

Investigative response center computing device 110 may receive the alert from incident communications device 130 of the occurrence of the incident as well as the GPS coordinates of the location of incident communications device 130 positioned at the location of the incident. Investigative response center computing device 110 may then establish a geo-fence that identifies a maximum radius from the location of the incident that witnesses may have adequately observed the incident. In an embodiment, the geo-fence may be established such that witnesses within the geo-fence had a high likelihood of observing the incident first-hand rather than receiving information associated with the incident from other sources. Witnesses that observed the incident first-hand may provide social media data that has not been tainted by the passing along of information associated with the incident from other sources.

Investigative response center computing device 110 may then search social media outlets such as news websites, Facebook, YouTube, Twitter, and so on for posts of social media data that provides insight to the incident that were posted from GPS coordinates within the geo-fence. As a result, investigative response center computing device 110 may limit the search of social media data providing insight to the incident to witnesses that captured the social media data first hand in order to improve the accuracy of the social media data. Investigative response center computing device 110 may then transmit the applicable social media data to investigator communications device 330 to aid the investigator in conducting the investigation of the incident.

For example, automobile traffic is stopped on Interstate 80 in Colorado during wintery conditions that severely hindered the quality of the roads. An individual sitting in a passenger car stopped in traffic observed a semi-trailer truck approaching the stopped traffic at high speeds. The individual then quickly captured video footage of the semi-truck trailer rear-ending a stopped passenger car and causing a multi-car pile-up via the communications device of the individual. The individual is now a witness of the accident and posts the video footage of the accident on YouTube from the witness communications device. The witness communications device is within the geo-fence established by investigative response center computing device 150. Investigative response center computing device 150 identifies the GPS coordinates of the witness communications device being within the geo-fence and discovers the posting of the video footage of the accident on YouTube. Investigative response center computing device 150 then transmits the video footage of the accident to investigator communications device 110 so that the investigator may include the video footage in the investigative report. In an example embodiment, step 330 may be performed by processor 125 of investigative response center computing device 150 as shown in FIG. 1.

In step 340, investigator communications device 110 may record social media data provided by investigative response center computing device 150. Similar to the incident data, investigator communications device 110 may also upload and save the social media data in a single location while at the location of the incident. The uploading and saving of the social media data along with the incident data by investigator communications device 110 provides ease in eventually generating the investigative report in a timely fashion. The investigator does not have to at a later time piece all of the social media data together with the incident data when attempting to generate the investigative report. Rather, all of the data that is pertinent to the incident including both the incident data and the social media data is uploaded and saved by investigator communications device 110 at the location of the incident.

The investigator may also identify potential witnesses of the incident from the social media data. As noted above, the social media data may have been captured by witnesses within the geo-fence of the incident. As a result, the social media data received by investigator communications device 110 may identify witnesses that may still be present at the location of the incident. The investigator may then track down the witnesses and interview the witnesses further to gather additional incident data from the interviews of the witnesses. In an example embodiment, step 340 may be performed by processor 170 of investigator communications device 110 as shown in FIG. 1.

In step 350, investigator communications device 110 may generate an investigative report outlining details of the incident. As noted above, the investigative report is a summary of data associated with the incident that is gathered and/or recorded by the investigator so that the investigative report may provide insight to the incident so that the investigative report may be relied upon in a formal analysis of the incident. Investigator communications device 110 may incorporate the incident data as well as the social media data already uploaded and saved in investigator communications device 110 into the investigative report. The investigative report may organize the incident data and the social media data in a manner such that the investigative report may clearly outline details of the incident. For example, the investigative report may organize the incident data and the social media data so that the investigative report clearly provides insight as to the cause of the incident, parties that are at fault of the incident, damage caused in the incident, each parties contribution to causing the damage, and so on.

The generation of the investigative report by investigator communications device 110 at the location of the incident expedites the amount of time required to generate the investigative report following the occurrence of the incident. The uploading and saving of the incident data and the social media data in a single location in investigator communications device 110 at the location of the incident as well as the generation of the investigative report including the incident data and the social media data by investigator communications device 110 provides ease and promptness in generating the investigative report.

The investigator does not have to accumulate the incident data and the social media data into a report by implementing means located off-site of the incident. For example, the investigator does not have to go to a personal computer off-site of the incident and then accumulate the incident data and the social media data into an organized report at the off-site computer and thus significantly extending the amount of time required to generate the investigative report from the initial occurrence of the incident.

Rather, the investigator may easily and promptly have investigator communications device 110 generate the investigative report at the location of the incident by easily incorporating the incident data and the social media data already uploaded and saved by investigator communications device 110. Such ease and promptness results in a thorough and robust investigative report that is generated within a threshold of time from the incident. The threshold of time being a threshold in which the incident data and the social media data was captured within a period of time that increases the likelihood that the incident data and the social media data represents an accurate representation of the incident as provided by the investigative report.

Further, the generation of the investigative report within the threshold of time from the incident may also provide further support in a formal analysis of the investigative report that the investigative report provides an accurate representation of the incident. The time stamp associated with the incident report that designates when the incident report was generated being within the threshold of time from the incident may indicate that the risk of the scene of the incident being altered as well as the data obtained from witnesses being tainted is significantly lowered due to the investigative report being generated so quickly.

In an embodiment, the incident data, social media data, and the investigative report may be transmitted investigative response center computing device 150 as data via network 120 when data service such as 3G and/or 4G is available to investigator communications device 110. The investigator may continue to upload and save incident data, social media data as well as the investigative report via investigator communications device 110 when data service is unavailable. In such an embodiment, investigator communications device 110 may cache the data locally until data service is restored in which investigator communications device 110 may then transmit the investigative report to investigative response center computing device 150.

In an embodiment, the individual may contact user interface 160 and press a button displayed by user interface 160 to generate the alert when data service such as 3G and/or 4G is available to incident communications device 130. Incident communications device 130 may transmit the alert via SMS and/or enable the individual to generate the alert via a direct dial when data service such as 3G and/or 4G is unavailable. In an example embodiment, step 350 may be performed by processor 170 of investigator communications device 110 as shown in FIG. 1.

In step 360, investigative response center computing device 150 may finalize the investigative report as generated by investigator communications device 110. As noted above, the investigative report may then be relied upon in a formal analysis of the incident. A formal analysis of the incident is an assessment by a party of interest to determine the responsibility of the parties involved in the incident as well as any monetary allocation that one party is responsible to another party following the incident.

For example, the party of interest may be the insurance company in which the individual involved in the incident subscribes to. The insurance company is then contractually obligated to insure the individual. However, the insurance company is going to rely on the investigative report to determine who is at fault in the incident and whether other individuals involved in the incident are responsible for covering monetary damages. In another example, a civil lawsuit is filed in which a court of law is to determine which party is at fault in the incident as well as the responsibility of each party with regards to covering monetary damages. The court of law is going to also rely on the investigative report to analyze the incident data and the social media data included in the investigative report to determine based on a legal determination who is at fault and the responsibility of each party involved.

Investigative response center computing device 150 may finalize the investigative report such that the investigative report is in a condition to be relied upon in a formal analysis of the incident. Investigative response center computing device 150 may add any additional data associated with the incident that the investigator may have overlooked to the investigative report. Investigative response center computing device 150 may also organize the incident data and the social media data included in the investigative report clearly provides insight as to the incident.

Investigative response center computing device 150 may treat the investigative report as if the investigative report is to be treated as evidence presented in any type of legal proceeding. Thus, investigative response center computing device 150 may execute any further action with regards to finalizing the investigative report that will be apparent from those skilled in the relevant art(s) without departing from the spirit and scope of the present disclosure such that the investigative report may be treated as evidence in a legal proceeding.

Investigative response center computing device 150 may store the finalized investigative report in investigative report database 190. As noted above, the investigative report may be treated as evidence in a legal proceeding. Thus, investigative response center computing device 150 may store the investigative report in investigative report database 190 such that the contents of the investigative report may be considered confidential, evidentiary, and subject to the same chain of custody rules applicable to all other testimonies and evidence presented in legal proceedings. In doing so, the investigative report may be relied upon as providing accurate insight of the incident in any formal analysis including legal proceedings.

Access to the investigative reports stored in investigative report database 190 may be limited to the parties of interest that would rely on the investigative reports. Such parties of interest may include but are not limited to insurance companies, companies that employ individuals involved in the incident, law enforcement agencies, judiciary authorities, and/or any other party of interest that has a stake in the incident that will be apparent from those skilled in the relevant art(s) without departing from the spirit and scope of the present disclosure. However, investigative response center computing device 150 may strictly control any such access to maintain the chain of custody rules for the investigative reports. For example, investigative response center computing device 150 may provide access to the investigative reports to the necessary parties of interest via a secure online environment that enables the parties of interest to download the investigative report from investigative report database 190 within a predetermined window of time.

Before giving any such access, investigative response center computing device 150 may confirm the party of interest requesting the access and may limit the access to the investigative reports that are of relevance to the party of interest requesting the access. For example, investigative response center computing device 150 may first confirm the identity of the insurance company requesting access to the investigative report of an automobile accident in which a subscriber of the insurance company was involved. Investigative response center computing device 150 may limit access of investigative report database 190 to the investigative report for the automobile accident.

In another example, investigative response center computing device 150 may first confirm the identity of judiciary officials requesting access several investigative reports of several different cases on the court's docket. Investigative response center computing device 150 may provide unlimited access of investigative report database 190 to the judiciary officials so that the judiciary officials may obtain the investigative reports necessary to conduct the legal proceedings. In an embodiment, the investigator that submitted the investigative report via investigator communications device 110 to investigative response center computing device 150 may no longer have access to the investigative report after such a submission. In an example embodiment, step 360 may be performed by processor 125 of investigative response center computing device 150 as shown in FIG. 1.

In step 370, the performance of the investigator that conducted the investigation may be assessed by investigative response center computing device 150. As noted above, an arrival of an investigator to the location of the incident within a short time frame from the occurrence of the incident is significant in an attempt to record incident data of the incident before the scene of the incident is altered and/or witnesses have departed the scene of the incident. Further, the detail provided in the investigative report with regards to the quantity of incident data recorded in the investigative report is also significant in generating an investigative report that may be accurately relied upon in a formal analysis of the incident as to providing accurate insight of the incident.

Thus, the investigator provides a significant role with regards to the quality of the investigative report. The timeliness in the acceptance of the investigation, the arrival of the investigator at the location of the incident, the recording of incident data, and the generation of the investigative report all hinge upon the performance of the investigator. Further, the quality of the investigative report such that the investigative report includes comprehensive incident data of the incident is also hinges upon the performance of the investigator.

After the investigator has completed the investigation and submitted the investigative report, investigative response center computing device 150 may analyze metrics associated with the quality of the investigation conducted by the investigator to determine whether the investigator should receive future alerts of incidents. Investigative response center computing device 150 may conduct quality control measures of investigators that implement investigator communications device 110 to limit investigators that receive alerts of incidents to those that have a solid performance record of conducting timely investigations as well as generating robust and comprehensive investigative reports.

For example, an investigator that accepted the alert to conduct an investigation but failed to arrive at the location of the incident until fours after the incident. The investigator also failed to interview witnesses still at the location of the incident based upon social media data provided to the investigator from investigative response center computing device 150. The investigator also failed to record important incident data detailing the incident that resulted in a poor investigative report. As time continues to lapse after the occurrence of the incident without gathering important incident data, that incident data cannot be obtained retroactively after the investigator failed to capture the incident data in a timely manner. As a result, investigative response center computing device 150 may rate this investigator poorly and refrain from transmitting alerts of future incidents to the investigator.

In another example, an investigator that accepts alerts of investigations at a high rate. The investigator arrives at the location of the incident in a timely manner after the occurrence of the incident. The investigator collects sufficient amounts of incident data in a short time frame following the occurrence of the incident and generates investigative reports of significant quality. As a result, investigative response center computing device 150 may rate this investigator well and continue to transmit alerts of future incidents to the investigator.

Investigative response center computing device 150 may gather metrics associated with investigators that include but are not limited to the proficiency in responding to calls, the timeliness of the investigator arriving at the location of the incident, the quality of incident data collected by the investigator, the timeliness of collecting the incident data from the occurrence of the incident, the quality of the incident report generated, the timeliness of the incident report generated from the occurrence of the incident, and/or any other types of metrics that impact the overall quality of the incident report that will be apparent to those skilled in the relevant art(s) without departing from the spirit and scope of the invention. Investigative response center computing device 150 may also gather metrics with regards to the incidents that have generated alerts such as the quantity of incidents that have occurred at a location, information with regards to the individual involved in the incident such as gender, age range, and so on, the nature of the incidents, and/or any other types of metrics related to the incident that will be apparent to those skilled in the relevant art(s) without departing from the spirit and scope of the invention.

Example Computer System

Figure 4:
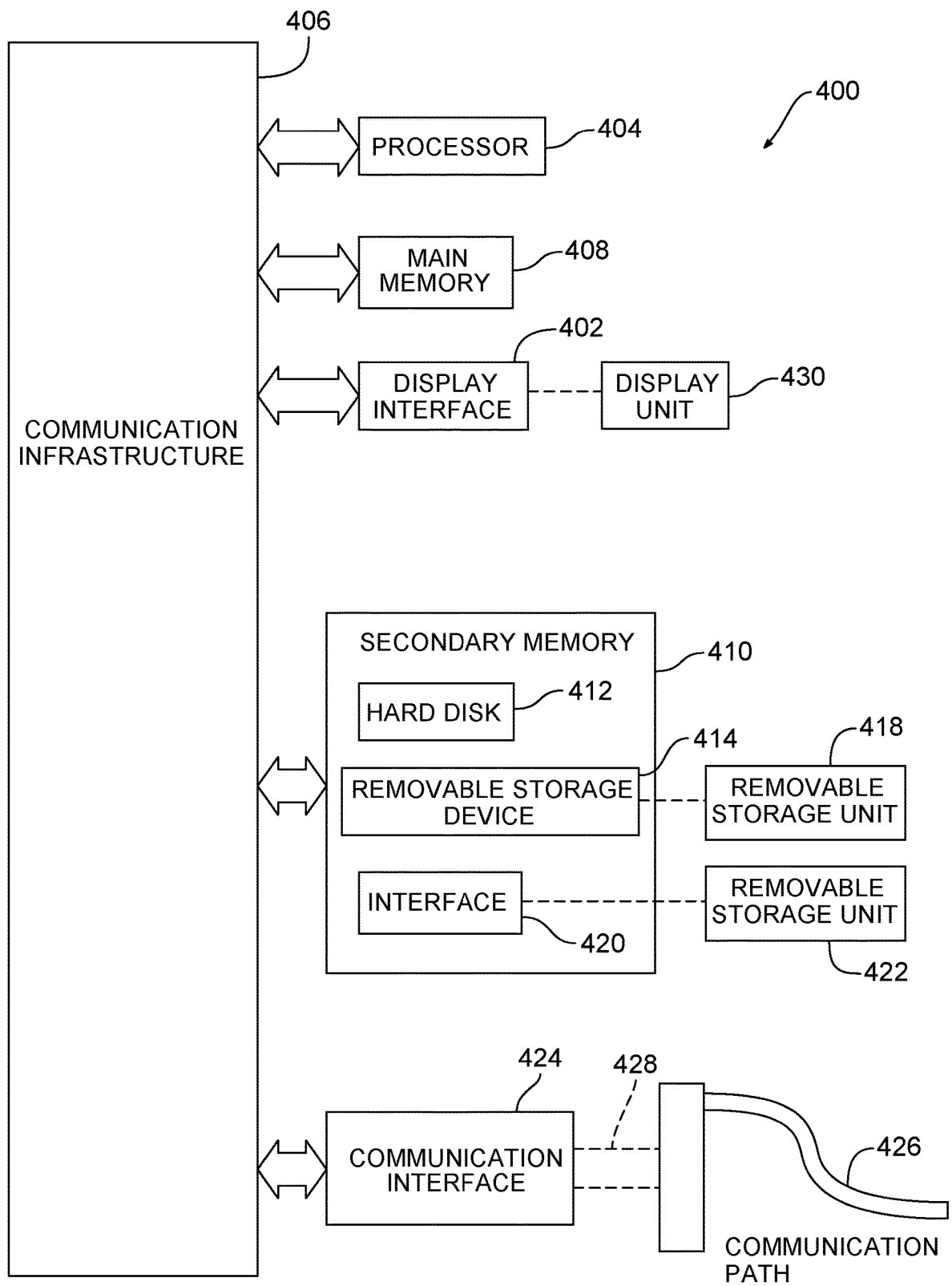
FIG. 4 is an example computer system in which embodiments of the invention, or portions thereof, may be implemented as computer-readable code.

FIG. 4 illustrates an example computer system 400 in which embodiments of the present invention, or portions thereof, may be implemented as computer-readable code. For example, investigative response center computing device 150, investigator communications device 110, and/or incident communications device 130 may be implemented on computer system 400 using hardware, software, firmware, tangible computer readable media having instructions stored thereon, or a combination thereof and may be implemented in one or more computer systems or other processing system.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

Various embodiments of the invention are described in terms of this example computer system 400. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, a computing device having at least one processor, such as processor 404, where the processor may be a single processor, a plurality of processors, a processor in a multi-core/multiprocessor system, such system operating alone, or in a cluster of computing devices operating in a cluster or server farm. Processor 404 is connected to a communication infrastructure 406, for example, a bus, message queue, network, or multi-core message-passing scheme.

Computer system 400 also includes a main memory 408, for example, random access memory (RAM), and may also include a secondary memory 410. Secondary memory 410 may include, for example, a hard disk drive 412, removable storage drive 414. Removable storage drive 414 may include a floppy disk drive, a magnetic tape drive, an optical disk drive, a flash memory, or the like. The removable storage drive 414 reads and/or writes to a removable storage unit 418 in a well-known manner. Removable storage unit 418 may include a floppy disk, magnetic tape, optical disk, etc. which is read by and written to by removable storage drive 414. As will be appreciated by persons skilled in the relevant art, removable storage unit 418 includes a computer readable storage medium having stored therein computer software and/or data.

In alternative implementations, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as that found in video game devices), a removable memory chip (such as EPROM or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interfaces 424 may include a modem, a network interface (such as an Ethernet card), a communications port, a PCMCIA slot and card, or the like. Software and data transferred via communications interface 424 may be in the form of signals, which may be electronic, electromagnetic, optical, or other signals capable of being received by communications interface 424. These signals may be provided to communications interface 424 via a communications path 426.

In this document, the terms "computer program storage medium" and "computer usable storage medium" are used to generally refer to storage media such as removable storage unit 418, removable storage unit 422, and a hard disk installed in hard disk drive 412. Computer program storage medium and computer usable storage medium may also refer to memories, such as main memory 408 and secondary memory 410, which may be semiconductor memories (e.g., DRAMS, etc.).

Computer programs (also called computer control logic) are stored in main memory 408 and/or secondary memory 410. Computer programs may also be received via communications interface 424. Such computer programs, when executed, enable computer system 400 to implement embodiments as discussed herein. In particular, the computer programs, when executed, enable processor 404 to implement the processes of embodiments of the invention, such as the stages in the method illustrated by flowchart 200 of FIG. 2 and flowchart 300 of FIG. 3 discussed above. Accordingly, such computer programs represent controllers of the computer system 400. When an embodiment is implemented using software, the software may be stored in a computer program product and loaded into computer system 400 using removable storage drive 414, interface 420, and hard disk drive 412, or communications interface 424.

Embodiments can work with software, hardware, and/or operating system implementations other than those described herein. Any software, hardware, and operating system implementations suitable for performing the functions described herein can be used. Embodiments are applicable to both a client and to a server or a combination of both.

The breadth and scope of the present disclosure should not be limited by any of the above-described example embodiments, but should be defined only in accordance with the following claims and their equivalents.

CONCLUSION

The Brief Summary and Abstract sections may set forth one or more but not all example embodiments and thus are not intended to limit the scope of embodiments of the invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of embodiments of the invention that others can, by applying knowledge within the skill of the art, readily modify and/or adapt for various applications such specific embodiments, without undue experimentation, without departing from the general concept of embodiments of the invention. Therefore, such adaptation and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the invention should not be limited by any of the above-described example embodiments, but should be defined only in accordance with the following claims and their equivalents.

What is claimed is:

1. A system for generating an investigative response to an incident, comprising:
   an investigator communications device operated by an investigator;
   an incident communications device positioned at a location of an incident; and
   an investigative response center;
   wherein each of the investigator communications device, the incident communications device, and the investigative response center comprise a network interface, a memory storing computer-readable instructions, and a processor; and
   wherein the respective processor of the investigator communications device, the incident communications device, and the investigative response center are together configured to execute the respective computer readable instructions to:
      automatically generate, via the incident communications device, an alert indicating the occurrence of the incident at the location;
      assign, via the investigative response center, a user identification number to the alert indicating the occurrence of the incident;
      determine, via the investigative response center, a geo-fence based on global positioning system (GPS) coordinates associated with the investigator communications device, wherein the geo-fence is determined based on a predetermined maximum radius from the location of the incident;
      determine, via the investigative response center, at least one investigator communications device for receiving the alert identifying the occurrence of the incident, wherein the at least one investigator communications device is within the geo-fence;
      transmit, via the investigative response center, the alert identifying the occurrence of the incident, to the at least one investigator communications device, wherein the alert is assigned a time-period of expiration for accepting the alert;
      receive, from the investigator communications device, confirmation from the investigator of acceptance of the investigative response;
      receive social media data from the investigative response center, wherein the social media data is associated with witness documentation of the incident that is recorded by at least one witness of the incident and then posted on at least one social media outlet, wherein the social media data is posted from a location within the geo-fence;
      generate an investigative report of the incident incorporating incident data associated with the incident that is obtained by the investigator at the location of the incident and the social media data;
      assign a rating to the investigator based on the incident data associated with the incident that is obtained by the investigator;
      transmit the rating to the investigative response center; and
      transmit the investigative report to the investigative response center, wherein the investigative report outlines details associated with the incident to be relied upon in a formal analysis of the incident, the details comprising cause of the incident, one or more parties at fault, damages, and the one or more parties' contribution to the damages.

2. The system of claim 1, wherein the acceptance is generated by the investigator communications device when the investigator begins investigating the incident at the location of the incident.

3. The system of claim 1, wherein the respective processors are further configured to execute the respective computer readable instructions to transmit, via the investigator communications device, an arrival of the accepting investigator at the location of the incident.

4. The system of claim 1 wherein the respective processors are further configured to execute the respective computer readable instructions to:
   transmit to the incident communications device via the investigator communications device, an image of the investigator so that an individual that is in possession of the incident communications device can identify the investigator when the investigator arrives to the location of the incident; and
   receive from the incident communications device via the investigator communications device, an image of a subject of the incident associated with the incident communications device so that the investigator can identify the subject of the incident that is associated with the incident communications device at the location of the incident.

5. The system of claim 1, wherein the generation of the investigative report comprises:
   capturing incident data that includes images of the incident by the investigator when at the location of the incident; and
   recording the images of the incident into the investigative report.

6. The system of claim 5, wherein the incident data that is captured and recorded into the investigative report comprises information associated with the incident, interviews of witnesses of the incident, and observations of the investigator.

7. The system of claim 1, wherein the investigative report is transmitted within a predetermined threshold of time from the occurrence of the incident.

8. An investigator communications device for generating an investigative response so that investigative personnel are alerted of the incident and information gathering of the incident is initiated using the investigator communications device, comprising:
- at least one processor; and
- a memory coupled with the processor, the memory including instructions that, when executed by the processor cause the processor to:
  - receive an alert identifying an occurrence of the incident requiring the investigative response, wherein the alert is generated from an incident communications device that is positioned at a location of the incident, and wherein the receipt of the alert is conditioned on global positioning system (GPS) coordinates of the investigator communications device being within a predetermined maximum radius of the location of the incident, the maximum radius being identified based on an estimated time for the investigator to travel to the location of the incident to adequately respond to the incident within a predetermined threshold of time from the occurrence of the incident;
  - receive social media data from an investigative response center, wherein the social media data is associated with witness documentation of the incident that is recorded by at least one witness of the incident and then posted on at least one social media outlet, and wherein the social media data was recorded from a location within the maximum radius;
  - record investigator data at the location of the incident; and
  - automatically transmit an investigative report to the investigative response center, wherein the investigative report outlines details associated with the incident to be relied upon in a formal analysis of the incident.

9. The investigator communications device of claim 8, wherein the instructions, when executed by the processor, further cause the processor to transmit to the investigative response center and the incident communications device an acceptance to respond to the alert by investigating the incident at the location of the incident.

10. The investigator communications device of claim 8, wherein the instructions, when executed by the processor, further cause the processor to receive the social media data from the investigative response center when GPS coordinates associated with at least one witness communications device that has generated social media data are within a radius of the location of the incident, wherein the radius is generated based on a geo-fence that identifies a maximum radius from the location of the incident for the at least one witness to adequately observe the incident.

11. The investigator communications device of claim 8, wherein the instructions, when executed by the processor, further cause the processor to transmit to the investigative response center and the incident communications device an arrival of the accepting investigator at the location of the incident.

12. The investigator communications device of claim 8, wherein the instructions, when executed by the processor, further cause the processor to:
- transmit to the incident communications device an image of the investigator so that an individual that is in possession of the incident communications device can identify the investigator when the investigator arrives to the location of the incident; and
- receive from the incident communications device an image of a subject of the incident associated with the incident communications device so that the investigator can identify the subject of the incident that is associated with the incident communications device at the location of the incident.

13. The investigator communications device of claim 8, wherein the instructions, when executed by the processor, further cause the processor to:
- capture incident data that includes images of the incident by the investigator when at the location of the incident; and
- record the images of the incident into investigative report.

14. The investigator communications device of claim 13, wherein the incident data that is captured and recorded into the investigative report comprises information associated with the incident, interviews of witnesses of the incident, and observations of the investigator.

15. The investigator communications device of claim 8, wherein the instructions, when executed by the processor, further cause the processor to transmit the investigative report to the investigative response center within a threshold of time from the occurrence of the incident.

16. A method for generating an investigative response to an incident so that information gathering of the incident is initiated at an investigative response center, comprising:
- receiving an alert at the investigative response center identifying an occurrence of the incident requiring the investigative response, wherein the alert is generated from an incident communications device that is positioned at a location of the incident;
- determining a plurality of investigators eligible to receive the alert generated by the incident communications device, wherein an investigator of the plurality of investigators is eligible to receive the alert when:
  - global positioning system (GPS) coordinates associated with the investigator's investigator communications device are within a radius of the location of the incident, wherein the radius is generated based on a geo-fence that identifies a maximum radius for the investigator to travel to adequately respond to the incident within a threshold of time from the occurrence of the incident; and
  - performance data associated with the investigator is positive, the performance data being generated from past investigations conducted by each investigator;
- searching for social media data associated with witness documentation of the incident that is recorded by at least one witness of the incident and then posted on at least one social media outlet, wherein the social media data was recorded from a location within the maximum radius; and
- transmitting from the investigative response center to an investigator communications device the social media associated with witness documentation of the incident to be provided in an investigative report outlining details associated with the incident to be relied upon in a formal analysis of the incident.

17. The method of claim 16, further comprising:
- generating a geo-fence that identifies a maximum radius from global positioning system (GPS) coordinates associated with the location of the incident, wherein the maximum radius is a distance from the location of the incident for at least one witness to adequately observe the incident.

18. The method of claim 17, further comprising:
searching social media outlets for social media data associated with witness documentation of the incident with GPS coordinates that are within the maximum radius established by the geo-fence.

19. The method of claim 16, further comprising:
receiving from the investigator communications device the investigative report outlining details associated with the incident to be relied upon in a formal analysis of the incident; and
transmitting the investigative report outlining the details associated with the incident to a party of interest that is associated with an individual that is in possession of the incident communications device.

20. The method of claim 19, wherein the transmitting of the investigative report to the investigative response center is transmitted within a threshold of time from the occurrence of the incident.

21. The method of claim 16, further comprising:
generating a plurality of incident metrics from the incident data associated with a plurality of incidents, wherein the plurality of incident metrics provides insight as to trends associated with the plurality of incidents.

22. An investigative response center computing device that generates an investigative response to an incident so that information gathering of the incident is initiated at an investigative response center, comprising:
at least one processor; and
a memory coupled with the processor, the memory including instructions that, when executed by the processor cause the processor to:
search social media data associated with witness documentation of the incident that is recorded by at least one witness of the incident and then posted on at least one social media outlet, wherein the social media data was recorded from a location within a maximum radius from the location of the incident;
receive an alert identifying an occurrence of the incident requiring the investigative response, wherein the alert is generated from an incident communications device that is positioned at a location of the incident; and
transmit the alert to a plurality of investigators eligible to receive the alert based on determining that global positioning system (GPS) coordinates associated with each investigator communications device are within a radius of the location of the incident wherein the radius is generated based on a geo-fence that identifies a maximum radius for each investigator to travel to adequately respond to the incident within a threshold of time from the occurrence of the incident;
transmit to an investigator communications device the social media associated with witness documentation of the incident to be provided in an investigative report outlining details associated with the incident to be relied upon in a formal analysis of the incident, wherein the investigator communications device is in possession of an investigator assigned to evaluate the incident.

23. The investigative response center computing device of claim 22, wherein the instructions that when executed by the processor, further cause the processor to identify a maximum radius from GPS coordinates associated with the location of the incident, wherein the maximum radius is a distance from the location of the incident for at least one witness to adequately observe the incident.

24. The investigative response center computing device of claim 23, wherein the instructions that when executed by the processor, further cause the processor to search social media outlets for social media data associated with witness documentation of the incident with GPS coordinates that are within the maximum radius established by the geo-fence.

25. The investigative response center computing device of claim 22, wherein the instructions that when executed by the processor, further cause the processor to:
receive from the investigator communications device the investigative report outlining details associated with the incident to be relied upon in a formal analysis of the incident; and
transmit the investigative report outlining the details associated with the incident to a party of interest that is associated with an individual that is in possession of the incident communications device.

26. The investigative response center computing device of claim 25, wherein the transmitting of the investigative report to the investigative response center is transmitted within a threshold of time from the occurrence of the incident.

27. The investigative response center computing device of claim 22, wherein the instructions that when executed by the processor, further cause the processor to:
evaluate performance data associated with the investigator that conducted an investigation of the incident; and
determine whether the investigator should be eligible to receive future alerts associated with future incidents enabling the investigator to engage in future investigations based on the performance data associated with the investigator.

28. The investigative response center computing device of claim 22, wherein the instructions that when executed by the processor, further cause the processor to generate a plurality of incident metrics from the incident data associated with a plurality of incidents, wherein the plurality of incident metrics provides insight as to trends associated with the plurality of incidents.

* * * * *